United States Patent
Boeck

(10) Patent No.: US 10,550,707 B2
(45) Date of Patent: Feb. 4, 2020

(54) TURBOMACHINE SEAL SYSTEM

(71) Applicant: MTU Aero Engines AG, München (DE)

(72) Inventor: Alexander Boeck, Kottgeisering (DE)

(73) Assignee: MTU Aero Engines AG, Munich (DE)

( * ) Notice: Subject to any disclaimer, the term of this patent is extended or adjusted under 35 U.S.C. 154(b) by 12 days.

(21) Appl. No.: 15/824,212

(22) Filed: Nov. 28, 2017

(65) Prior Publication Data

US 2018/0149032 A1 May 31, 2018

(30) Foreign Application Priority Data

Nov. 30, 2016 (DE) .......................... 10 2016 223 867

(51) Int. Cl.
*F01D 11/00* (2006.01)
*F16J 15/08* (2006.01)
*F01D 9/02* (2006.01)

(52) U.S. Cl.
CPC ......... *F01D 11/005* (2013.01); *F16J 15/0887* (2013.01); *F01D 9/02* (2013.01); *F05D 2220/32* (2013.01); *F05D 2230/60* (2013.01); *F05D 2240/57* (2013.01); *F05D 2300/6033* (2013.01)

(58) Field of Classification Search
CPC ........ F16J 15/02; F16J 15/0887; F01D 9/041; F01D 9/00; F01D 11/00; F01D 11/005; F02C 7/00; F02C 7/28; F05D 2300/00; F05D 2300/505
See application file for complete search history.

(56) References Cited

U.S. PATENT DOCUMENTS

| | | | | |
|---|---|---|---|---|
| 4,022,948 A | * | 5/1977 | Smith | F02K 1/805 239/265.39 |
| 5,118,120 A | * | 6/1992 | Drerup | F16J 15/021 277/628 |
| 5,143,292 A | * | 9/1992 | Corsmeier | F02K 1/12 239/127.3 |
| 5,524,846 A | * | 6/1996 | Shine | B64D 27/00 244/121 |
| 5,797,723 A | | 8/1998 | Frost | |
| 6,402,466 B1 | | 6/2002 | Burdgick et al. | |

(Continued)

FOREIGN PATENT DOCUMENTS

| | | |
|---|---|---|
| EP | 1 270 875 A2 | 1/2003 |
| EP | 2886803 | 6/2015 |
| WO | WO2015152742 | 10/2015 |

*Primary Examiner* — Gilbert Y Lee
(74) *Attorney, Agent, or Firm* — Davidson, Davidson & Kappel, LLC

(57) ABSTRACT

A seal system for a turbomachine, in particular a gas turbine, which includes a first component (10A, 10B), a second component (20), a flap (30) for sealing a gap between the first and second components, and a leaf spring, which includes a first leg (41) and a second leg (42), in a mounting state in which the flap and the second component do not contact each other, a projection of an abutment area (11) of the first component (10A, 10B), against which the first leg (41) is supported via the flap (30), is situated perpendicularly to a contact line (K) through at least two contact points of the first leg (41) with the flap (30), at least partially within a bearing surface (A) of the first component (10A, 10B), against which the second leg (42) of the pretensioned leaf spring is supported.

18 Claims, 2 Drawing Sheets

(56) References Cited

U.S. PATENT DOCUMENTS

| | | | |
|---|---|---|---|
| 6,464,457 B1* | 10/2002 | Morgan | F01D 11/005 |
| | | | 277/630 |
| 7,524,167 B2* | 4/2009 | Ohri | F01D 9/023 |
| | | | 277/544 |
| 8,459,041 B2 | 6/2013 | Flanagan et al. | |
| 9,643,733 B2* | 5/2017 | Livingston | B64D 45/00 |
| 10,138,742 B2* | 11/2018 | Budnick | F01D 9/041 |
| 10,145,256 B2* | 12/2018 | Ratajac | F01D 11/003 |
| 2014/0248127 A1 | 9/2014 | Chuong et al. | |
| 2016/0153299 A1 | 6/2016 | Tuertscher et al. | |

* cited by examiner

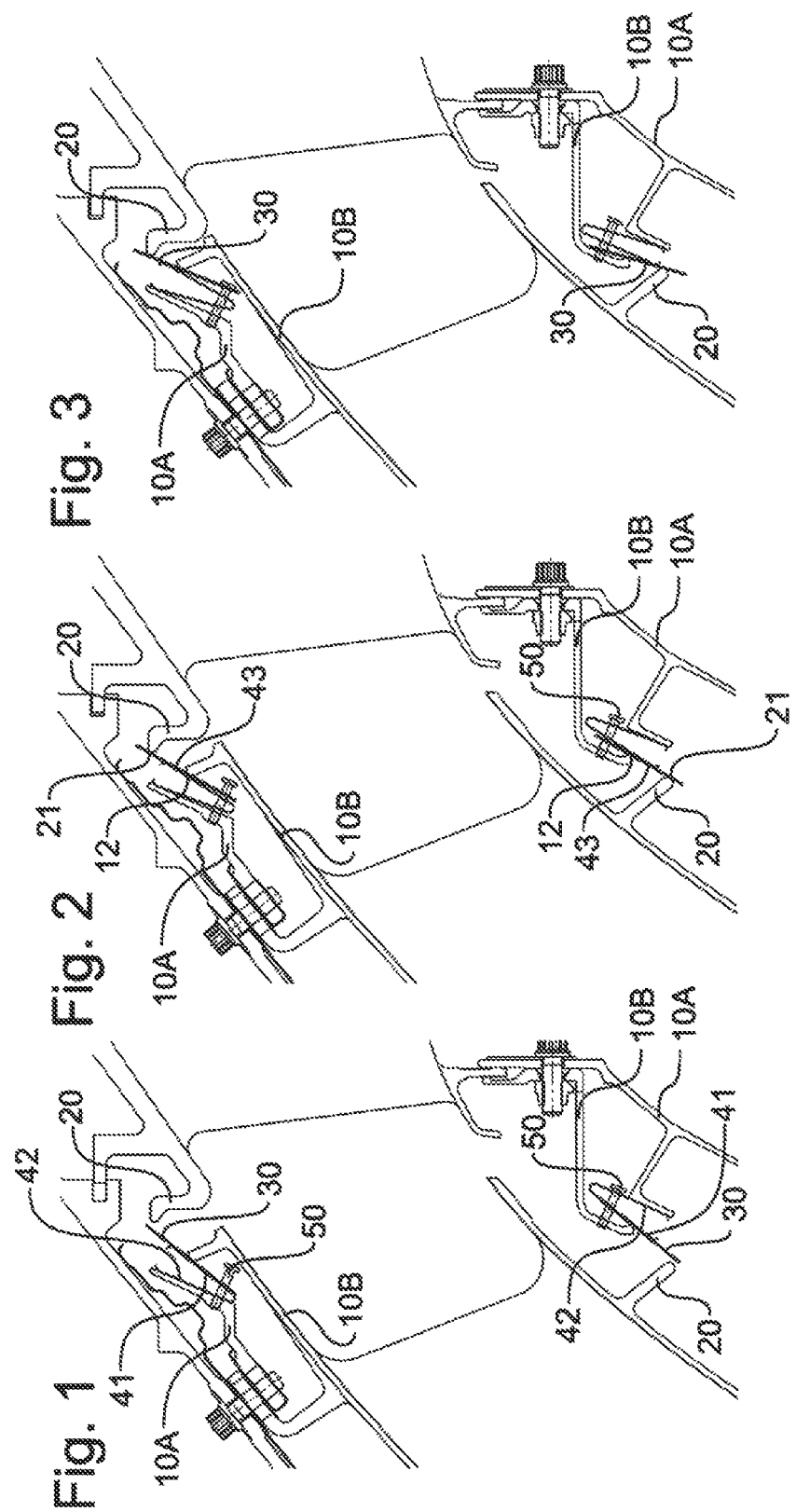

TURBOMACHINE SEAL SYSTEM

This claims the benefit of German Patent Application DE102016223867.1, filed Nov. 30, 2016 and hereby incorporated by reference herein.

The present invention relates to a seal system for a turbomachine, in particular a gas turbine, a turbomachine, in particular a gas turbine, which includes the seal system, as well as a method for sealing a gap between a first and second component of the seal system, and a method for mounting the seal system.

A seal system is known from EP 1 270 875 A2, which includes a first and a second component, a flap for sealing a gap between the first and second components, and a leaf spring, which includes a first and a second leg, a projection of an abutment area of the first component, against which the first leg is supported via the flap, being situated perpendicularly to the first leg, outside a bearing surface of the first component, against which the second leg of the pretensioned leaf spring is supported.

SUMMARY OF THE INVENTION

It is an object of the present invention to improve a seal system, which includes a flap for sealing a gap between a first and a second component of a turbomachine, in particular its mounting and/or function.

The present invention provides a seal system and a method. A turbomachine, which includes at least one seal system described herein is also provided.

According to one embodiment of the present invention (at least) one seal system for a turbomachine, in particular a gas turbine, in particular (at least) one seal system of a turbomachine, in particular a gas turbine, in particular for a compressor or turbine stage of the gas turbine, includes a first component and a second component, between which a gap, in particular a ring (segment) gap, is formed. Multiple seal systems for the turbomachine(s) may include the same or a shared (first) component and/or the same or a shared (second) component. In one embodiment, a shared or the same component, on the one hand, may additionally or alternatively form one or the first component of a seal system according to the present invention and simultaneously one or the second component of another seal system according to the present invention, in particular (simultaneously) an element of the first component of this one seal system according to the present invention and/or an element of this second component of this additional seal system according to the present invention.

In one embodiment, the first and/or the second component is/are a single- or multi-part or a single- or multi-piece or a single- or multi-element component, in particular a stator component, the present invention being particularly advantageously usable for the sealing thereof.

In one embodiment, the first and/or the second component additionally or alternatively includes a ceramic matrix composite (CMC); in particular, it may be made thereof. The present invention may be particularly advantageously used with such materials, in particular, since in one embodiment it may be easily and/or compactly formed and/or implemented on the first and/or second component(s) without any great structural complexity.

According to one embodiment of the present invention, a flap of the seal system at least partially and/or temporarily seals the gap between the first and second components, in particular in at least one state, which in the present case is referred to as the sealing state without any loss of generality, in particular the operating state, of the seal system or turbomachine, or it is provided, in particular configured, for this purpose.

In one embodiment, an operating behavior of the turbomachine may be improved hereby, in particular fluid chambers, in particular gas chambers, are at least temporarily and/or partially separated from each other by the (closed) flap(s), in particular a cooling air area and a hot gas channel area or the like.

In one embodiment, the flap is movably, in particular pivotably, supported. In one embodiment, in particular, thermally induced relative movements between the first and second components may be at least partially compensated for hereby.

In one embodiment, the flap is designed in the manner of a ring segment. In one embodiment, in particular annular gaps around a rotation or (main) machine axis of the turbomachine or segments thereof may be advantageously sealed hereby. Correspondingly, according to one embodiment of the present invention, multiple of the seal systems described herein are or become situated side by side in a circumferential direction around a rotation or (main) machine axis of the turbomachine and/or perpendicularly hereto in a radial direction for the purpose of sealing one or multiple annular gaps, as mentioned above these seal systems then including the same or a shared first component and the same or a shared second component, or the same, shared component being able to form a first component of a first and simultaneously a second component of a second seal system.

According to one embodiment of the present invention, a leaf spring of the seal system includes a first leg and a second leg, which in one refinement are connected in a V- or U-shaped manner in a connecting section of the leaf spring. In one refinement, the leaf spring is made from the two legs and the connecting section.

In one embodiment, an advantageous, in particular lightweight and/or compact, seal system may be provided hereby.

According to one embodiment of the present invention, in one state, which in the present case is referred to as the mounting state without any loss of generality, in which the flap and the second component do not, in particular do not yet, contact each other, a projection of an abutment area of the first component, against which the first leg is supported via or through the flap, is situated perpendicularly to a contact line through at least two contact points, in which the first leg and the flap touch each other, in particular perpendicularly to a contact surface, in particular a contact cone surface or contact plane through at least three contact points, in which the first leg and the flap touch each other, partially or completely within a bearing surface of the first component, against which the second leg of the pretensioned leaf spring is supported, in particular under or in contact with the first component or directly, in particular in one or multiple, in particular all, axial sections or planar sections of the seal system which contain a rotation or (main) machine axis of the turbomachine.

In one embodiment, a mounting and/or function of the seal system may be improved hereby. In particular, in one embodiment, the flap may be advantageously aligned before or during a mounting of the two components on each other, thereby reducing the danger of tilting during mounting.

In one embodiment, the abutment area of the first component is punctiform or linear and/or situated on an edge, in particular a chamfer or a radius of the first component, in particular a radial flange of the first component.

In one embodiment, kinematics of a flap movement may be improved hereby.

In one embodiment, the first leg and the flap abut each other planarly, in particular over a wide area, in the mounting state, in particular on or over at least 75% of their overlap area, or they are provided, in particular configured, for this purpose. In one embodiment, the first leg and/or the flap are provided with a conical or flat design to form the contact surface, in particular the contact cone surface or contact plane.

In one embodiment, the flap may be advantageously aligned and/or supported hereby before or during a mounting of the second component.

In one embodiment, in at least one sealing state, in which the flap and the second component contact each other, a contact area of the first leg with the flap is situated between a support of the flap on the second component and a support of the flap on the first component, which, in one embodiment, may at least essentially coincide with the abutment area or be situated in its vicinity.

As a result, in one embodiment, the flap may be advantageously, in particular in a stable manner, (pre)tensioned against the two supports in this sealing state and thus advantageously seal the gap between the first and second components.

In one embodiment, the first leg and the flap no longer abut each other planarly (over a wide area), in this sealing state, in particular only (still) on at least 35% of their overlap area, or they are provided, in particular configured, for this purpose. In one embodiment, the contact area of the first leg with the flap in this sealing state constitutes, in particular, at most 75% of the contact surface of the first leg with the flap in the mounting state. In other words, in one embodiment, the planar contact (over a wide area) of the flap with the first leg is reduced on the contact area of the first leg described above with the flap, or merges therewith, due to the transition from the mounting state to this sealing state.

In one embodiment, the seal system includes one or multiple positioning elements, in particular at least or exactly two positioning elements spaced a distance apart, in particular in a circumferential direction around a or the rotation or (main) machine axis of the turbomachine, on which the flap and/or the leaf spring is/are or become(s) secured.

In one embodiment, advantageous kinematics of the flap and/or the leaf spring may be represented hereby and/or their mounting improved.

In one refinement, the flap and/or the leaf spring (each) is/are or become(s) movably, in particular pivotably and/or displaceably, secured on the positioning element or on one or multiple of the positioning elements.

In one embodiment, advantageous kinematics of the flap and/or the leaf spring may be represented hereby and/or their mounting improved.

In one refinement, the positioning element or one or multiple of the positioning elements (each) become(s) or is/are connected, in particular detachably, in particular screwed, to the first component, in particular a flange which forms the bearing surface or is provided, in particular configured for this purpose.

In one embodiment, the mounting and/or removal of the flap and/or the leaf spring may be improved hereby.

In one refinement, the positioning element or one or multiple of the positioning elements (each) pass(es) through a through-opening in the flap and/or one or multiple through-openings in the leaf spring, in particular a through-opening in its first leg and/or a through-opening in its second leg.

In one embodiment, advantageous kinematics of the flap and/or the leaf spring may be represented hereby and/or their mounting improved.

In one refinement, a gap, which in one embodiment is at least 0.1 mm, in particular at least 1 mm and/or at least 0.1%, in particular at least 1%, of a (maximum) diameter of the through-opening, is formed (in each case) between the positioning element or one or multiple of the positioning elements and the through-opening(s) through which it/they pass in the flap and/or in the leaf spring.

In one embodiment, advantageous kinematics of the flap and/or the leaf spring may be represented hereby and/or their mounting improved.

In one embodiment, the first component includes a first element, which forms or has the bearing surface or is provided, in particular configured, for this purpose, and a second element, which is in particular detachably connected, in particular screwed, thereto and which forms or has the abutment area or is provided, in particular configured, for this purpose.

In one embodiment, the mounting and/or removal of the flap and/or the leaf spring may be improved hereby.

In one embodiment, the turbomachine includes at least one first seal system as described herein, and at least one second seal system as described herein, in one refinement the first component of the first seal system forming one element of the (multi-part) first component, the second component of the second seal system or an element thereof.

In one embodiment, the mounting and/or removal of the flaps and/or leaf springs of the first and/or second seal system(s) may be improved hereby, and/or a (more) simple and/or (more) compact turbomachine may be provided.

According to one embodiment of the present invention, the flap and the second component contact each other to seal the gap between the first and second components of the seal system or the turbomachine in at least one sealing state, the contact area of the first leg with the flap being situated between the support of the flap on the first component and the support of the flap on the second component.

As a result, in one embodiment, the two supports act as sealing lips and thus seal the gap.

According to one embodiment of the present invention, to mount the seal system in the mounting state, the flap thereof is clamped against the abutment area by the contact surface of the first leg of the pretensioned leaf spring, and the seal system is placed into a sealing state by moving the two components against each other, in particular displacing them (also or only) in the axial direction in parallel to the rotation or (main) machine axis of the turbomachine, in which the flap and the second component contact each other, and a contact area of the first leg with the flap is situated between the support of the flap on the first component and the support of the flap on the second component.

BRIEF DESCRIPTION OF THE DRAWINGS

Further advantageous refinements of the present invention are derived from the subclaims and the following description of preferred embodiments, showing a partially schematic illustration.

FIG. 1 shows an axial section of a turbomachine, including a radially outer and a radially inner seal system, according to one embodiment of the present invention in a mounting state;

FIG. 2 shows the turbomachine in a sealing state;

FIG. 3 shows the turbomachine in another sealing state;

DETAILED DESCRIPTION

Figure 4:
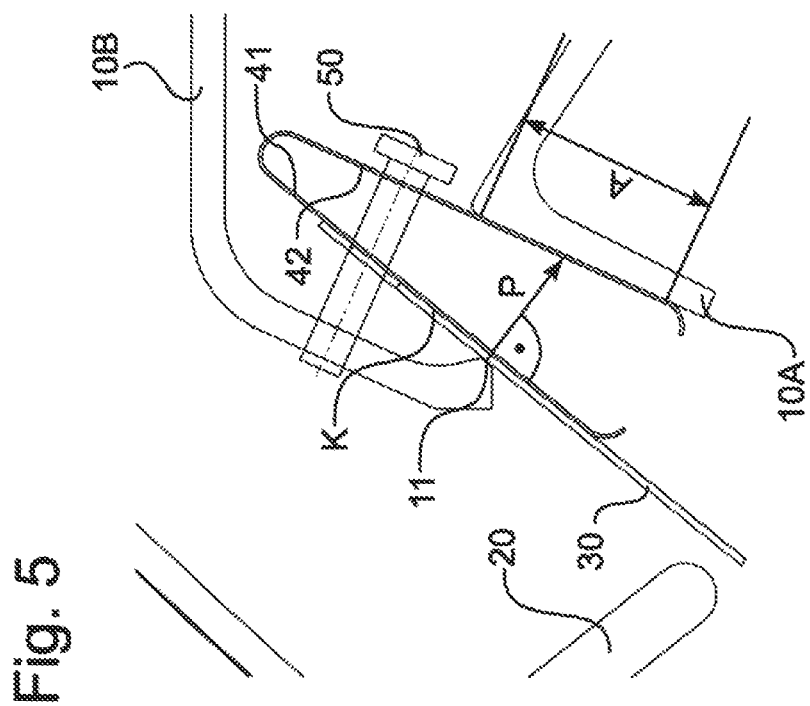
FIG. 4 shows the radially outer seal system from FIG. 1 in an enlarged representation.
Figure 5:
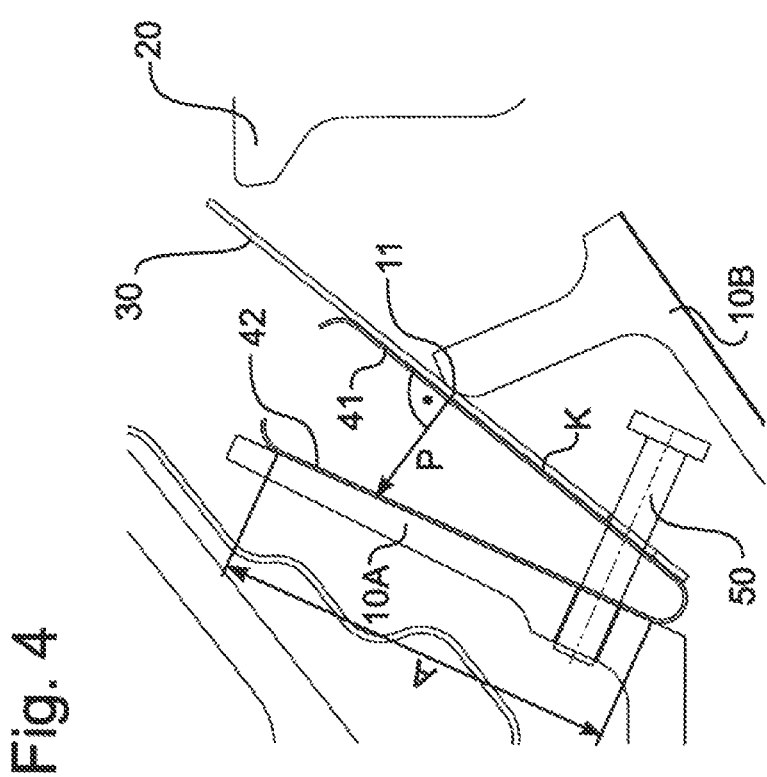
FIG. 5 shows the radially inner seal system from FIG. 1 in an enlarged representation.

FIG. 1 shows an axial section of a turbomachine, i.e. a section whose sectional plane contains a rotation or (main) machine axis of the turbomachine, including a first, radially outer seal system, (upper view in FIG. 1), which is illustrated in an enlarged representation in FIG. 4, and a second, radially inner seal system (bottom view in FIG. 1), which is illustrated in an enlarged representation in FIG. 5, according to one embodiment of the present invention in a mounting state, and in a sealing state in FIGS. 2, 3.

Corresponding features of the first radially outer and second radially inner seal systems are identified by identical reference numerals.

Apart from these two seal systems apparent in the axial section, the turbomachine includes additional first and second seal systems of the same design, which are situated adjacent to each other in the circumferential direction around the rotation or (main) machine axis (horizontally in FIGS. 1 through 5).

These first or second seal systems distributed in the circumferential direction each seal an annular gap between a first stator component 10A, 10B and a second stator component 20 of the turbomachine in the sealing states.

A second element 10B of the first stator component of a first radially outer seal system (top view in FIGS. 1 through 3) (simultaneously) forms in each case a second stator component 20, designed to be integral therewith, of a second radially inner seal system (bottom view in FIGS. 1 through 3). In other words, this shared component forms second element 10B of the first stator component of the first radially outer seal system, while simultaneously forming second stator component 20 of the second radially inner seal system. The first stator components each includes a first element 10A and a second element 10B screwed thereto.

The seal systems each include a ring segment-like, pivotably supported flap 30 and a leaf spring, which includes a first leg 41 and a second leg 42.

In the mounting state illustrated in FIGS. 1, 4, 5, in which flap 30 and second component 20 do not yet contact each other, a projection of an abutment area 11 of second element 10B of the first component, against which first leg 41 is supported via or through flap 30, is situated, as indicated by projection direction P in FIGS. 4, 5, perpendicularly to a conical contact surface K, in which first leg 41 and flap 30 touch each other over a wide area and from which a corresponding contact line is apparent, which is also identified by K in the illustrated section, completely within a bearing surface A of first component 10A of the multi-part first component, against which second leg 42 of the pretensioned leaf spring is supported under or in contact with the first component or directly.

Abutment area 11 of the first component or its second element 10B is linear and situated on a radius of a radial flange of the first component or its second element 10B.

In the mounting state, first leg 41 and flap 30 abut each other planarly on or over at least 75% of their overlap area, so that flap 30 is clamped against abutment area 11 by contact surface K of first leg 41 of the pretensioned leaf spring.

To mount the seal systems, the latter are placed into the sealing state illustrated in FIG. 2 by displacing the two components horizontally in the figures toward each other in the axial direction in parallel to the rotation or (main) machine axis of the turbomachine; in this sealing state, flap 30 and second component 20 contact each other, and a contact area 43 of first leg 41 with flap 30 (radially on first leg 41) is situated between a support 12 of flap 30 in abutment area 11 of first component 10 and a support 21 of flap 30 on second component 20.

In this sealing state, first leg 41 and flap 30 no longer abut each other over a wide area but only on at most 35% of their overlap area, so that the contact area of first leg 41 with flap 30 in this sealing state is at most 75% of contact surface K of first leg 41 with flap 30 in the mounting state.

By displacing the two components farther in the axial direction, the seal systems may be placed into the sealing state illustrated in FIG. 3, in which the leaf spring pivots farther, or its second leg 42 essentially loses its contact over a wide area with first element 10A of the first component.

The seal systems each include two positioning pins 50, which are spaced a distance apart in the circumferential direction around the rotation or (main) machine axis of the turbomachine and on which flaps 30 and the leaf springs each are pivotably secured.

For this purpose, positioning elements 50 each pass through a through-opening in flap 30 and a through-opening in both legs 41, 42 of the leaf spring and are or become screwed to a flange of first element 10A of the first component, which forms bearing surface A, a gap being formed in each case between positioning element 50 and the through-opening in flap 30 through which it passes and the through-openings in both legs 41, 42 of the leaf spring through which positioning element 50 passes, so that flaps 30 and the leaf springs are pivotably secured on positioning elements 50.

To seal the gap between first and second components 10, 20, flaps 30 and second component 20 contact each other in the sealing states illustrated in FIGS. 2, 3, contact areas 43 of first leg 41 with flaps 30 being situated between support 12 of flap 30 on first component 41 and support 21 of flap 30 on second component 20.

While the description above explains exemplary embodiments, it should be pointed out that a large number of modifications are possible. Moreover, it should be pointed out that the exemplary embodiments are only examples which are not intended to limit the scope of protection, the applications and the design in any way. Rather, the description above gives those skilled in the art a guideline for implementing at least one exemplary embodiment, various modifications being possible, in particular with respect to the function and arrangement of the described components, without departing from the scope of protection as it is derived from the claims and feature combinations equivalent to the claims.

LIST OF REFERENCE NUMERALS

10A/B first/second element (first component)
11 abutment area
12 support
20 second component
21 support
30 flap
41 first leg
42 second leg
43 contact area
50 positioning pin
A bearing surface
K contact surface and contact line
P projection direction

What is claimed is:

1. A sealing system for a turbomachine, the sealing system comprising:
   a first component having an abutment area and a bearing surface;
   a second component;
   a flap for sealing a gap between the first and second components; and
   a leaf spring including a first leg and a second leg,
   wherein in a mounting state in which the flap and the second component do not contact each other,
a vector (P) projecting from the abutment area towards the second leg, and normal to a contact line (K) defined by at least two contact points of the first leg with the flap, is situated at least partially within the bearing surface of the first component, the second leg of the leaf spring being supported against the bearing surface, the leaf spring being pretensioned in said mounting state.

2. The seal system as recited in claim 1 wherein the first leg and the flap abut each other planarly in the mounting state.

3. The seal system as recited in claim 1 wherein, in a sealing state the flap and the second component contact each other, and in the sealing state a contact area of the first leg with the flap is situated between a support of the flap on the first component and a further support of the flap on the second component.

4. The seal system as recited in claim 1 further comprising at least one positioning element, the flap or the leaf spring being secured on the positioning element.

5. The seal system as recited in claim 4 wherein the flap or the leaf spring is movably secured on the positioning element.

6. The seal system as recited in claim 4 wherein the positioning element is connected to the first component.

7. The seal system as recited in claim 6 wherein the first component includes a flange forming the bearing surface, the positioning element connected to the flange.

8. The seal system as recited in claim 4 wherein the positioning element passes through a through-opening in the flap or at least one through-opening in the leaf spring.

9. The seal system as recited in claim 8 wherein a gap is formed between the positioning element and the through-opening in the flap or the through-opening in the leaf spring.

10. The seal system as recited in claim 1 wherein the first or second component is a stator component of the turbomachine.

11. The seal system as recited in claim 1 wherein the first or second component is a stator component of a compressor or turbine stage.

12. The seal system as recited in claim 1 wherein the first or second component includes a ceramic matrix.

13. The seal system as recited in claim 1 wherein the first component includes a first element forming the bearing surface and a second element connected detachably to the first element and forming the abutment area.

14. A turbomachine comprising at least one seal system as recited in claim 1.

15. The turbomachine as recited in claim 14 wherein the at least one seal system includes at least one first seal system as recited in claim 1 and at least one second seal system as recited in claim 1, the first component of the first seal system forming the second component of the second seal system or an element thereof.

16. A gas turbine comprising the turbomachine as recited in claim 14.

17. A method for sealing a gap between the first and second components of the seal system as recited in claim 1, the method comprising: contacting the flap and the second component with each other in a sealing state, and a contact area of the first leg with the flap being situated between a support of the flap on the first component and a further support of the flap on the second component.

18. A method for mounting a seal system as recited in claim 1, the method comprising:
   in the mounting state, clamping the flap against the abutment area by the contact surface of the first leg of the pretensioned leaf spring, and placing the seal system in a sealing state by moving the first and second components toward each other, so that the flap and the second component contact each other, and a contact area of the first leg with the flap is situated between a support of the flap on the first component and a further support of the flap on the second component.

* * * * *